United States Patent [19]

Lejeune

[11] 4,006,326

[45] Feb. 1, 1977

[54] ABRASION SWITCH DEVICE FOR DETECTING LOW TIRE PRESSURE

[75] Inventor: Daniel Lejeune, Clermont-Ferrand, France

[73] Assignee: Compagnie Generale des Etablissements Michelin, raison sociale Michelin & Cie, Clermont-Ferrand, France

[22] Filed: Dec. 23, 1974

[21] Appl. No.: 535,700

[30] Foreign Application Priority Data

Jan. 2, 1974 France .............................. 74.00097

[52] U.S. Cl. ......................... 200/61.24; 200/61.08; 200/61.44
[51] Int. Cl.² .................... H01H 35/24; H01H 3/16
[58] Field of Search .......... 200/61.08, 61.24, 61.4, 200/61.44, 61.22, 61.25; 337/401–405, 411–416; 340/52 A, 58, 52 B; 188/1 A

[56] References Cited

UNITED STATES PATENTS

| | | | |
|---|---|---|---|
| 1,003,009 | 9/1911 | Reimann | 337/405 |
| 2,204,237 | 6/1940 | Slack et al. | 337/412 |
| 2,518,788 | 8/1950 | Jackson et al. | 337/415 |
| 3,294,941 | 12/1966 | Mullen | 337/415 X |
| 3,387,593 | 6/1968 | Gingras | 337/414 X |
| 3,413,598 | 11/1968 | Uphoff | 200/61.24 X |
| 3,510,835 | 5/1970 | Gilbert | 337/401 X |
| 3,556,258 | 1/1971 | Winge et al. | 188/1 A |
| 3,628,093 | 12/1971 | Crowley | 337/415 X |
| 3,649,959 | 3/1972 | Sakata et al. | 200/61.44 X |
| 3,761,911 | 9/1973 | Hiltz et al. | 200/61.08 X |
| 3,882,448 | 5/1975 | Shibatani et al. | 200/61.4 X |
| 3,902,158 | 8/1975 | Dahlkvist | 200/61.4 X |

Primary Examiner—James R. Scott
Attorney, Agent, or Firm—Brumbaugh, Graves, Donohue & Raymond

[57] ABSTRACT

An alarm device signals a substantial drop in the inflation pressure of the tires on the wheels of an automotive vehicle. The device comprises a portion of an electric circuit located at the free end of a flexible rod which is covered with a layer of material of low resistance subject to abrasion. The covering material is removed by abrasion as the vehicle travels over the road if tire pressure is low. The electric circuit, consisting of two wire-like elements, may be either normally closed or normally open. In the latter instance, the separated wires are fused together. In both embodiments, this change in the condition of the circuit causes an alarm to be set off.

4 Claims; 4 Drawing Figures

ABRASION SWITCH DEVICE FOR DETECTING LOW TIRE PRESSURE

BACKGROUND OF THE INVENTION

This invention relates to alarm devices and, more particularly, to alarm devices intended to be installed on an automotive vehicle in order to signal a substantial drop in the inflation pressure of the tires on the wheels of the vehicle. The invention relates with still greater particularity to a device comprising an electric circuit having means detecting a change in the condition of the circuit and a flexible rod one end of which is fastened to a fixed, unsuspended part of the vehicle, the free end of the rod being directed towards the ground.

There are already known devices of the general type described above. However, in these known devices, the inclination of the rod varies with respect to the ground when its free end touches the ground. If the variation in inclination exceeds a given value, this causes a change in the condition of the electric circuit by closing it. Such a device is described for instance in French patent No. 981,827. This type of device has certain drawbacks. One drawback is that, each time the rod changes its inclination upon a contact of short duration with the ground, for instance on a road which is in poor condition, it modifies the condition of the electric circuit and therefore sets off the alarm signal. Another drawback is that, in order to ensure the closing of the electric circuit under the effect of the inclination of the rod, it is necessary to provide relatively complicated mechanical means, which may get out of order.

Devices are also known in which the flexible rod is arranged at a slight distance from one sidewall of a tire and is deflected by the fact that when the inflation pressure of the tire decreases, the sidewalls of the tire curve more towards the outside. This deflection has the result that the sidewall of the tire which faces the flexible rod modifies the inclination of the rod, which then leaves its position of rest in which it keeps the electrical circuit closed. The circuit is then opened, which causes a signal to be generated to alert the driver.

A drawback of this known device is that it is difficult to use with radial tires since they have very flexible sidewalls which, even at normal pressure, deform a great deal near the area of contact with the ground, particulaly when going around curves.

SUMMARY OF THE INVENTION

An object of the invention is to provide a device of the general type described above which does not have the above-enumerated drawbacks of the known devices and which, while being simple, strong, inexpensive and easy to install and requiring practically no maintenance, causes the setting off of an alarm signal not in response to jolts of the vehicle on a poor road but only when the tire shows excessive deflection due to a decrease in the inflation pressure.

These and other objects are attained in accordance with the invention by the provision of a device comprising an electric circuit of which a portion is located at the free end of a flexible rod and covered with a layer of material which has relatively low resistance to wear by abrasion.

In use, this device does not produce any signal as long as such portion of the electric circuit is not directly in contact with the ground, that is to say as long as the material with which such portion is covered has not been worn by prolonged rubbing on the ground, for instance over several hundred meters. In the case of abrasion by the ground over a distance of several hundred meters, the portion of the electric circuit directly in contact with the ground modifies the condition of the electric circuit either by opening the circuit, which represents a preferred embodiment of the invention, or by closing the circuit.

The embodiment of the invention having a normally closed circuit is preferred, since any break, regardless of cause, in a wire or other similar occurrence in this circuit will cause the alarm signal to be set off, which is not the case with a normally open circuit.

In the former case, the opening of the circuit is caused by the breaking of the portion of the electric circuit in contact with the ground, which break occurs immediately upon the disappearance of the material with which such portion was covered.

In the latter case, the closing of the circuit is ensured by the fact that the ends of two blades which constitute such portion of the electric circuit and are normally separated from each other by an insulating material, which preferably melts when moderately heated, make contact with each other after the disappearance of this material as a result of the prolonged rubbing of the free end of the rod on the ground.

In both cases, the modification of the condition of the electric circuit of the device actuates a relay, preferably transistorized, which is contained in this circuit. The relay in turn causes generation of a signal which alerts the driver.

In a preferred embodiment of the invention, the rod of the device is of reinforced rubber and the portion of the circuit extending in it is embedded in this rubber. The rubber reinforcement can comprise textile threads or metal wires, a blade of metallic or synthetic flexible material and/or the wires of the electric circuit.

If the rod comprises reinforced rubber, the material that covers the portion of the electric circuit located at the end of the rod may be formed of the same rubber as the rubber of the rod.

Depending on the resistance to wear by abrasion of the material covering such portion of the electric circuit, the thickness of the material may vary between about 0.5 mm and several millimeters.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
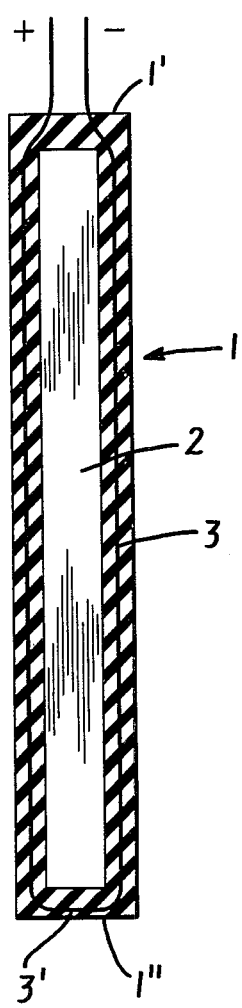
FIG. 1 is a front longitudinal cross section through a device according to the invention designed to be used with a normally closed electric circuit.
Figure 3:
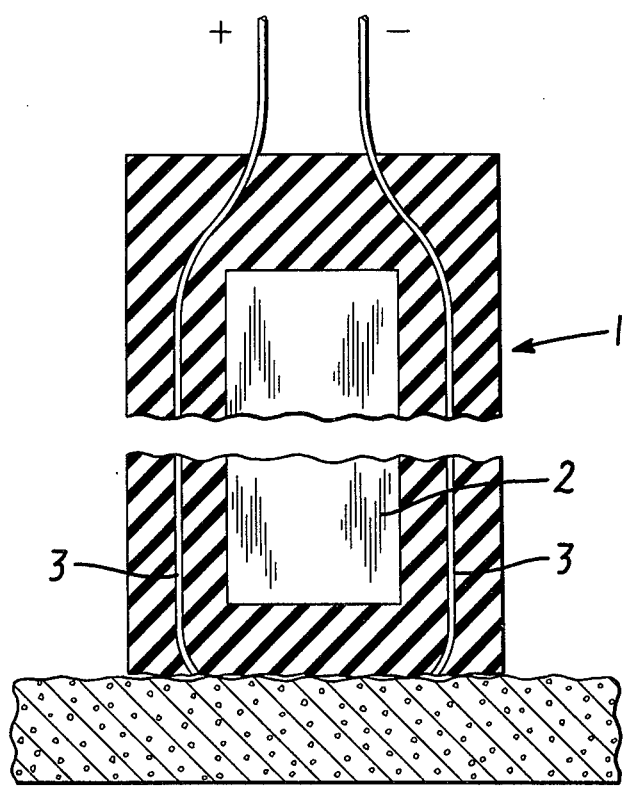
FIGS. 3 and 4 are fragmentary views similar to FIGS. 1 and 2 but on a larger scale showing the operation of the devices of FIGS. 1 and 2, respectively.

The rod 1 shown in FIG. 1 and 3 is of flexible material, for instance rubber. It has the shape of an elongated parallelepiped with two end faces 1' and 1" and is reinforced by a flexible metal blade 2 which extends over the major portion of its length. Within this rod there is embedded, spaced from the blade 2, a looped electrical conductor 3, for instance a copper wire, which comprises, at the end 1" of the rod intended to be placed near the ground, a section 3' which extends transversely and which is substantially parallel to the ground when the rod 1 is in position on the vehicle. The two ends of the looped conductor 3 emerge from the rod 1 through the end 1' of the rod which is fastened to an unsuspended part of the vehicle, for instance a kingpin of a wheel (not shown).

The section 3' of the loop 3 is at a very small distance from the end 1" of the rod 1, for instance 1 mm, so that this section is not directly in contact with the road when the end 1" touches it only for an instant, for instance as a result of a bump in the road. On the other hand, if the end rubs over the ground for several hundred meters as a result of a substantial drop in pressure of the tire, the rubber or other material constituting the end 1" of the rod will disappear by abrasion, and the section 3' of the loop 3 will be exposed and will in turn rub on the ground and be broken. The electric circuit to which the loop 3 is connected will thus be opened, and a device that detects such opening will set off an alarm signal.

Figure 2:
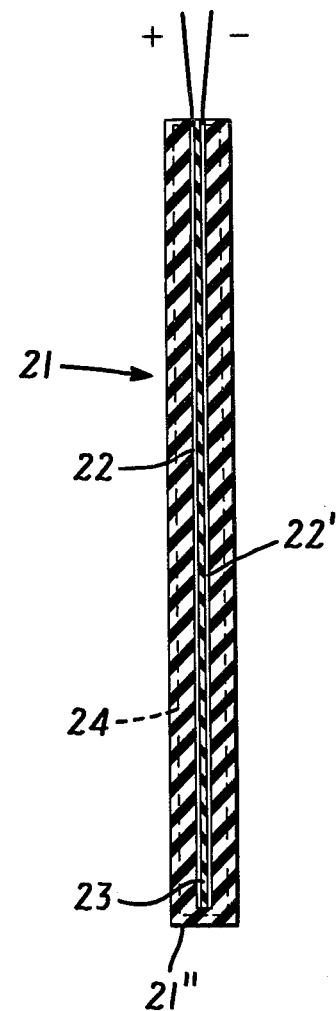
FIG. 2 is a side longitudinal cross section through another device according to the invention designed to be used with a normally open electric circuit.
Figure 4:
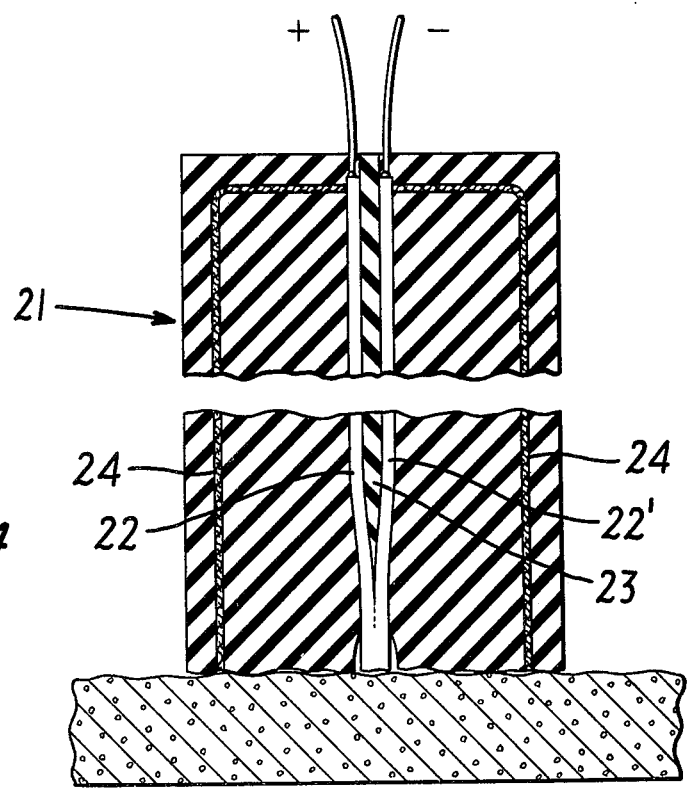

In the embodiment shown in FIGS. 2 and 4, the flexible rod 21 is similar to the flexible rod 1 shown in FIGS. 1 and 3. However, it differs from the latter in that it contains, not a looped wire conductor, but rather two thin blades of copper 22 and 22' arranged parallel to the longitudinal direction of the rod and separated from each other by a space 23 of about a few tenths of a millimeter fitted with an electrically insulating material such as rubber having a low melting point. This material may be, for instance, a layer of rubber having a melting point of about 100° C. The electric circuit to which these two blades are connected is therefore normally open. When the end 21" of the rod 21, located about 1.5 mm from the ends of the blades 22 and 22', has rubbed for a few hundred meters on the road, these two blades will in turn be exposed and rub on the road, and the heat produced by this rubbing will rapidly melt the layer 23 of rubber or other heat-meltable material. The two blades 22 and 22' when rubbing on the ground will not fail to touch each other, thus closing the electric circuit. A device responsive to the closing of the electric circuit will then set off the signal warning the driver.

The flexible rod 21 can be reinforced by a fabric 24 surrounding the two blades at some distance from them.

When the wear layer at the end of the flexible rod 1 or 21 has disappeared, the rod must of course be replaced by a new one, which can be done easily and inexpensively at the same time as the defective tire is repaired or replaced.

Thus there is provided in accordance with the invention a novel and highly effective device for warning of low tire pressure in ample time to avoid the danger to life and property that a loss of tire pressure otherwise entails. Many other embodiments of the invention will readily occur to those skilled in the art upon a consideration of this disclosure. Accordingly, the invention is not limited except by the following claims.

I claim:

1. An alarm device for installation on an automotive vehicle or the like to signal a substantial drop in the inflation pressure of the tires on the wheels of said vehicle, said device comprising an electric circuit which can be in an open or closed condition, which is normally in the open condition, and a change to the closed condition of which can be detected and a flexible rod adapted to be fastened to a fixed, unsuspended part of the vehicle, said rod having a free end adapted to be directed towards the ground, said free end being normally spaced apart from the ground but coming into contact with the ground upon a substantial drop in inflation pressure, said device being characterized in that said electric circuit comprises two blade conductors located at said free end which are covered with a layer of material of low resistance to wear by abrasion, said two blade conductors being separated from each other by a thin layer of an electrically insulating material which has a low melting point, said two blade conductors making contact with each other upon the wearing away, by contact with the ground, of said layer of material of low resistance to wear by abrasion and melting of said thin layer of electrically insulating material, whereby said circuit is closed.

2. An alarm device for installation on an automotive vehicle or the like to signal a substantial drop in the inflation pressure of the tires on the wheels of said vehicle, said device comprising an electric circuit which can be in an open or closed condition and a change in the condition of which can be detected and a flexible rod made of rubber and adapted to be fastened to a fixed, unsuspended part of the vehicle, said rod having a free end adapted to be directed towards the ground, said free end being normally spaced apart from the ground but coming into contact with the ground upon a substantial drop in inflation pressure, said device being characterized in that said electric circuit comprises a portion which is located at said free end and at least partially embedded in said rubber, said rubber having low resistance to wear by abrasion and the condition of said circuit being changed upon the wearing away of said rubber by contact with the ground, further comprising at least one layer of fabric forming a reinforcement for said flexible rubber rod.

3. An alarm device for installation on an automotive vehicle or the like to signal a substantial drop in the inflation pressure of the tires on the wheels of said vehicle, said device comprising an electric circuit which can be in an open or closed condition and a change in the condition of which can be detected and a flexible rod made of rubber and adapted to be fastened to a fixed, unsuspended part of the vehicle, said rod having a free end adapted to be directed towards the ground, said free end being normally spaced apart from the ground but coming into contact with the ground upon a substantial drop in inflation pressure, said device being characterized in that said electric circuit comprises a portion which is located at said free end and at least partially embedded in said rubber. said rubber having low resistance to wear by abrasion, further comprising at least one metallic element forming a reinforcement for said flexible rubber rod.

4. An alarm device according to claim 3, wherein the metallic element forming said reinforcement is a part of said electric circuit.

* * * * *